(12) United States Patent
Koc et al.

(10) Patent No.: US 9,277,440 B2
(45) Date of Patent: Mar. 1, 2016

(54) COMMUNICATION OF PREFERRED POWER CONSUMPTION CONFIGURATIONS

(71) Applicant: INTEL CORPORATION, Santa Clara, CA (US)

(72) Inventors: Ali T. Koc, Portland, OR (US); Satish C. Jha, Hillsboro, OR (US); Rath Vannithamby, Portland, OR (US); Maruti Gupta, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 42 days.

(21) Appl. No.: 14/125,593

(22) PCT Filed: Sep. 27, 2013

(86) PCT No.: PCT/US2013/062172
§ 371 (c)(1),
(2) Date: Dec. 12, 2013

(87) PCT Pub. No.: WO2014/052751
PCT Pub. Date: Apr. 3, 2014

(65) Prior Publication Data
US 2015/0092641 A1    Apr. 2, 2015

Related U.S. Application Data

(60) Provisional application No. 61/707,784, filed on Sep. 28, 2012.

(51) Int. Cl.
*H04W 28/02* (2009.01)
*H04W 52/02* (2009.01)
(Continued)

(52) U.S. Cl.
CPC .......... *H04W 28/0221* (2013.01); *H04W 4/005* (2013.01); *H04W 24/08* (2013.01);
(Continued)

(58) Field of Classification Search
None
See application file for complete search history.

(56) References Cited

U.S. PATENT DOCUMENTS

2014/0036750 A1\*  2/2014  Yavuz et al. ................ 370/311
2014/0044029 A1\*  2/2014  Chou ............... H04W 52/0212
                                                                  370/311

(Continued)

FOREIGN PATENT DOCUMENTS

KR    2010-00902012        3/2012

OTHER PUBLICATIONS

International Search Report and Written Opinion received for PCT Patent Application No. PCT/US2013/062172, mailed on Jan. 13, 2014, 12 pages.

(Continued)

*Primary Examiner* — Ashley Shivers
(74) *Attorney, Agent, or Firm* — Thorpe North & Western LLP

(57) ABSTRACT

Technology for communicating power preference indication (PPI) message is described. A user equipment (UE) may receive PPI configuration information, from an evolved node B (eNB), wherein the PPI configuration information includes a predetermined threshold for a number of PPI messages that the UE can communicate to the eNB during a defined time window. The UE may communicate a plurality of PPI messages after sending a low power consumption configuration to the eNB during the defined time window, wherein the plurality of PPI messages each indicate a change in preferred power consumption configuration. The UE may detect that the plurality of PPI messages exceeds the predetermined threshold for the number of PPI messages that the UE can communicate to the eNB during the defined time window as defined in the PPI configuration information. The UE may initiate a threshold timer in response to the plurality of PPI messages exceeding the predetermined threshold to restrict additional PPI messages from being communicated to the eNB until expiration of the threshold timer.

23 Claims, 11 Drawing Sheets

(51) Int. Cl.

| | | |
|---|---|---|
| | *H04W 52/04* | (2009.01) |
| | *H04W 48/14* | (2009.01) |
| | *H04W 52/14* | (2009.01) |
| | *H04W 72/04* | (2009.01) |
| | *H04W 24/08* | (2009.01) |
| | *H04W 40/24* | (2009.01) |
| | *H04W 48/16* | (2009.01) |
| | *H04W 72/02* | (2009.01) |
| | *H04W 76/02* | (2009.01) |
| | *H04W 4/00* | (2009.01) |
| | *H04W 88/02* | (2009.01) |
| | *H04W 76/04* | (2009.01) |
| | *H04W 36/08* | (2009.01) |
| | *H04W 48/18* | (2009.01) |

(52) U.S. Cl.
CPC ............ *H04W40/246* (2013.01); *H04W 48/14* (2013.01); *H04W 48/16* (2013.01); *H04W 52/0209* (2013.01); *H04W 52/0212* (2013.01); *H04W 52/0235* (2013.01); *H04W 52/04* (2013.01); *H04W 52/14* (2013.01); *H04W 72/02* (2013.01); *H04W 72/042* (2013.01); *H04W 72/0406* (2013.01); *H04W 72/0413* (2013.01); *H04W 76/025* (2013.01); *H04W 76/046* (2013.01); *H04W 88/02* (2013.01); *H04W 36/08* (2013.01); *H04W 48/18* (2013.01); *H04W 52/0261* (2013.01); *Y02B 60/50* (2013.01)

(56) References Cited

U.S. PATENT DOCUMENTS

2014/0071872 A1\* 3/2014 Guo et al. ............... 370/311
2015/0223166 A1\* 8/2015 Keskitalo .......... H04W 52/0212 370/311

OTHER PUBLICATIONS

ZTE, "Summary of email discussion [78#43] LTE/EDDA: Power Preference Indication", R2-123413, 3GPP TSG-RAN WG2 Meeting #79, Qingdao, P.R.C., Aug. 13-17, 2012, 21 pages.

ZTE, "Draft CR 36.311: Introduction of 'Power Preference Indication' (option a+RRC signalling)", R2-123414, 3GPP TSG-RAN WG2 Meeting #79, ZTE Corporation, Qingdao, P.R.C., Aug. 13-17, 2012, 18 pages.

China Unicom, "Discussion on UE Power Preference Indication", R2-123512, 3GPP TSG RAN WG2 Meeting #79, Qingdao, China, Aug. 13-17, 2012, 3 pages.

New Postcom, "Discussion on Power Preference Indication of EDDA", R2-123525, 3GPP TSG-RAN2#79, Qingdao, China, Aug. 13-17, 2012, pp. 1-4.

Research in Motion UK Limited, "Details of Power Preference Indication", R2-123732, 3GPP TSG-RAN WG2 Meeting #79, Qingdao, China, Aug. 13-17, 2012, 5 pages.

3GPP TS 36.331, "Evolved Universal Terrestrial Radio Access (E-UTRA), Radio Resource Control (RRC), Protocol Specification", Technical Specification Group Radio Access Network, V11.0.0, Release 11, Jun. 2012, pp. 1-302.

\* cited by examiner

```
-- ASN1START

OtherConfig-r9 ::= SEQUENCE {
    reportProximityConfig-r9      ReportProximityConfig-r9      OPTIONAL, -- Need ON
    ...,
    [[ powerPrefIndicationConfig-r11   PowerPrefIndicationConfig-r11   OPTIONAL, -- Need ON
    ]]
}

ReportProximityConfig-r9 ::= SEQUENCE {
    proximityIndicationEUTRA-r9   ENUMERATED {enabled}   OPTIONAL,   -- Need OR
    proximityIndicationUTRA-r9    ENUMERATED {enabled}   OPTIONAL,   -- Need OR
}

PowerPrefIndicationConfig-r11 ::= SEQUENCE {
    powerPrefIndication-Enabled-r11    ENUMERATED {enabled}    OPTIONAL,   -- Need OR
    powerPrefIndication-Timer-r11      ENUMERATED {
        s0, s0dot5, s1, s2, s5, s10, s20, s30, s60, s90, s120, s300, s600, spare3, spare2, spare1}
                                                              OPTIONAL,   -- Need ON
    powerPrefIndication-TimeWindow     Integer(n2..N340)      OPTIONAL,   -- Need ON
    powerPrefIndication-Nthreshold     Integer(n2...N341)     OPTIONAL,   -- Cond ppiENABLED
}

-- ASN1STOP
```

FIG. 5

| OtherConfig field descriptions |
|---|
| reportProximityConfig<br>Indicates, for each of the applicable RATs (EUTRA, UTRA), whether or not proximity indication is enabled for CSG member cell(s) of the concerned RAT. Note. |
| powerPrefIndication-Enabled<br>The field is used to indicate whether Power Preference Indication reporting from the UE is allowed or not. |
| powerPrefIndication-Timer<br>Prohibit timer for Power Preference Indication reporting. Value in seconds. Value s0 means prohibit timer is set to 0 second or not set, value s0dot5 means prohibit timer is set to 0.5 second, value s1 means prohibit timer is set to 1 second and so on. |
| powerPrefIndication-TimeWindow<br>It indicates the Time window size value in terms of T340. For example if powerPrefIndication-TimeWindow =2, Time window will be 2 times T340. |
| powerPrefIndication-Nthreshold<br>Upper limit of Number of PPI message exchange during each Time window after which T340 timer will start upon sending each 'lowpowerconsumption' PPI. |

FIG. 6A

| Constant | Usage |
|---|---|
| N310 | Maximum number of consecutive "out-of-sync" indications received from lower layers |
| N311 | Maximum number of consecutive "in-sync" indications received from lower layers |
| N340 | Maximum value of powerPrefIndication-TimeWindow |
| N341 | Maximum value of powerPrefIndication-Nthreshold (i.e. maximum value of PPI message exchanges during powerPrefIndication-TimeWindow after which T340 timer will start upon sending each 'lowpowerconsumption' PPI.) |

FIG. 6B

COMMUNICATION OF PREFERRED POWER CONSUMPTION CONFIGURATIONS

RELATED APPLICATIONS

The present application claims priority to U.S. Provisional Patent Application No. 61/707,784, filed Sep. 28, 2012, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the Third Generation Partnership Project (3GPP) Long Term Evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 5 illustrates an abstract syntax notation (ASN) code example for communicating preferred power consumption configurations using a threshold timer in accordance with an example;

FIGS. 6A and 6B are tables with field descriptions of various parameters and constants, respectively, used for communicating preferred power consumption configurations using a threshold timer in accordance with an example;

Figure 1:
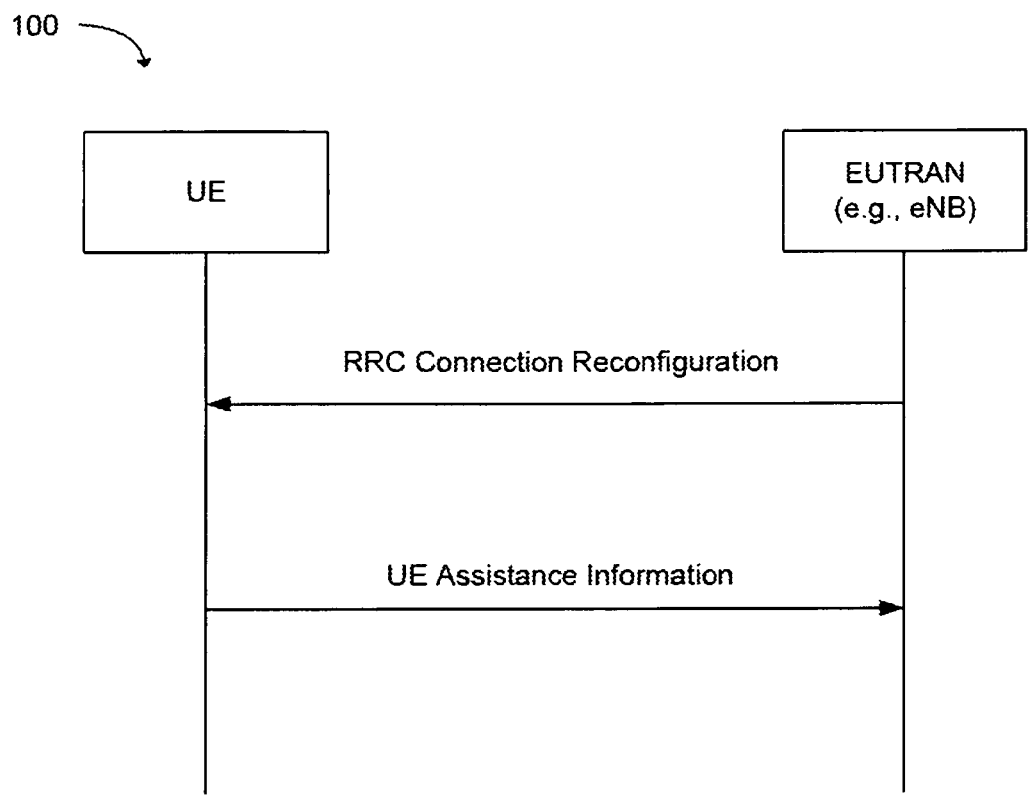
FIG. 1 is a block diagram illustrating communications between a user equipment (UE) and an Evolved Universal Terrestrial Radio Access Network (E-UTRAN) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

In 3GPP Release 11, enhancements for diverse data applications (eDDA) are related to improving power efficiency of device and signaling overhead over an air interface while supporting diverse data applications in LTE. In one example, the UE may communicate a power preference indication (PPI) message to an evolved node B (eNB). The PPI message may be one-bit UE assistance information message that improves the UE's power efficiency in the context of background traffic. In other words, the UE may communicate its preferred power consumption configuration (i.e., PPI information) to the eNB using the UE assistance information message. In response, the eNB may set or establish the UE's power consumption configuration.

The preferred power consumption configuration of the UE may be a default power consumption configuration or a lower power consumption configuration. The default power consumption configuration may be the UE's preferred power consumption configuration in terms of when UE requires guaranteed performance. The lower power consumption configuration is preferred for power saving purposes. When a power preference is not configured or is disabled at the UE, the network may assign the default power configuration to the UE. In addition, the default power configuration may represent a preferred UE power configuration that is optimized for active traffic, such as delay sensitive applications. An active traffic session may include a time period when a user is actively interacting with the UE.

The lower power consumption configuration may represent a preferred UE power configuration that is optimized for device power saving and is suitable for background traffic. A background traffic session may represent the duration when the user is not directly interacting with the UE. During the background traffic session, applications may run in the background and generate updates, notifications, etc. The low power consumption configuration may configure the UE to have a relatively lower power consumption as compared to the default power consumption configuration. However, the default power consumption configuration may be more suitable to maintain other performance parameters as compared to the low power consumption configuration, such as lowering end-to-end latency for delay sensitive applications.

In general, the PPI may allow the UE to efficiently reconfigure its power saving configuration based on the requirements of the applications running on the UE. However, each PPI indication incurs signaling overhead over the air and hence a mechanism to avoid excessive or frequent power saving configuration changes may be needed. In LTE Release 11, a timer based mechanism is used to avoid excessive signaling of power preference indication from the UE. Thus, in LTE Release 11, the UE may not communicate an additional preferred power consumption configuration to the eNB until expiry of the timer (e.g., a T340 prohibit timer). In other words, only after expiry of the timer, the UE may communicate an additional preferred power consumption configuration to the eNB.

As an example, the timer may be started upon the UE communicating the UE assistance information message indicating a default power consumption configuration. After the timer starts, the UE cannot communicate additional PPI information indicating a low power consumption configuration until expiry of the timer. Thus, the UE changing from the default power consumption configuration to the low power consumption configuration cannot occur before a wait time that corresponds with the timer (e.g., T340).

In one example, the UE may have previously indicated its preference for a power configuration that is optimized for power saving (i.e., the low power consumption configuration). If the UE detects an initiation of active traffic (e.g., a delay sensitive application) with stringent delay requirements, the UE may convey a new preferred power consumption configuration (e.g., a default power consumption configuration for achieving lower latency) to the network as soon as possible for ensuring the delay performance. However, if the T340 timer is applied in this case, the UE may need to wait until the timer expires before conveying the new preferred power consumption configuration. Since the low power consumption configuration is optimized for power saving and not latency, the delay in changing from the low power consumption configuration to the default power consumption configuration may adversely affect the UE's latency performance.

The power saved from the UE assistance information can be balanced with minimizing the delay requirements of applications running on the UE. In one example, the UE may not start the timer upon changing to the low power consumption configuration, thereby improving latency performance by allowing the UE to switch to a default power consumption configuration in less time. However, by not starting the timer, the number of times the UE switches its preferred power consumption configuration and signaling of UE assistance may increase. Thus, as described in further detail below, the signaling of UE assistance may be limited when the timer is not started after the UE transitions to the low power consumption configuration.

FIG. 1 is a block diagram illustrating exemplary communications between a user equipment (UE) and an Evolved Universal Terrestrial Radio Access Network (E-UTRAN). In one example, the EUTRAN may include a plurality of evolved node Bs (eNBs). The EUTRAN may communicate a radio resource control (RRC) connection reconfiguration message to the UE. In general, the RRC connection reconfiguration message may modify an RRC connection between the EUTRAN and the UE. The RRC connection reconfiguration message may be used to establish or modify radio bearers, perform handover, setup or modify measurements, etc.

After receiving the RRC connection reconfiguration message, the UE may communicate a UE assistance information message to the EUTRAN. The UE assistance information message may indicate a preferred power consumption configuration for the UE, such as a low power consumption configuration or a default power consumption configuration. As previously discussed, the low power consumption configuration may configure the UE to have a relatively lower power consumption as compared to the default power consumption configuration.

As discussed in greater detail below, the low power consumption configuration and the default power consumption configuration may affect the discontinuous reception (DRX) cycles associated with the UE. In a wireless wide area network (WWAN), such as the Third Generation Partnership Project (3GPP) Long Term Evolution (LTE) network Release 8, the concept of discontinuous reception (DRX) was introduced for saving power. DRX can be used to enable a wireless device, such as a user equipment (UE) in a 3GPP LTE network, to discontinuously monitor a control channel, such as the physical downlink control channel (PDCCH) communicated from a transmission station such as an enhanced NodeB (eNodeB). The discontinuous monitoring can provide significant power savings at the UE since the receiver at the UE can be turned off.

In one example, a WWAN transceiver in a wireless device can communicate with a transmission station, referred to as a network node, to negotiate time periods in which the wireless device will receive communications from the network node. During the negotiated times when information is not received, the wireless device can turn its receiver off and enter a low power state. Discontinuous reception is used in a number of different wireless communication standards, including but not limited to 3GPP LTE Rel. 8, 9, 10, 11 and 12, and the Institute of Electrical and Electronics Engineers (IEEE) 802.11 standard.

In the 3GPP LTE standard, a set of functionalities are provided to enable an LTE configured receiver in a UE to perform sleep events. These sleep events may last anywhere from a single millisecond to hundreds of milliseconds or longer. The duration and timing of the sleep events can be negotiated between the UE and the network node. The negotiation may be performed using high level signaling, such as an Open Systems Interconnection (OSI) level 3 communication or another type of high level signaling. One example of an OSI level 3 communication in the 3GPP LTE standard is radio resource control (RRC) signaling. In the LTE standard, RRC signaling is used to control DRX operations at the LTE configured transceiver in the UE. The RRC signaling can be used to manage the use of DRX by setting various parameters. For example, one of the parameters includes the DRX Cycle which identifies the periodic repetition of an active period, identified as an "On Duration", followed by a possible period of inactivity. There is a DRX Long cycle and a DRX Short cycle. Additional example parameters include an On Duration timer, a DRX Inactivity timer, a DRX Retransmission timer, a DRX Short Cycle, a Short DRX Cycle timer, an uplink (UL) Retransmission Timer, and a downlink (DL) Retransmission Timer.

Figure 2A:
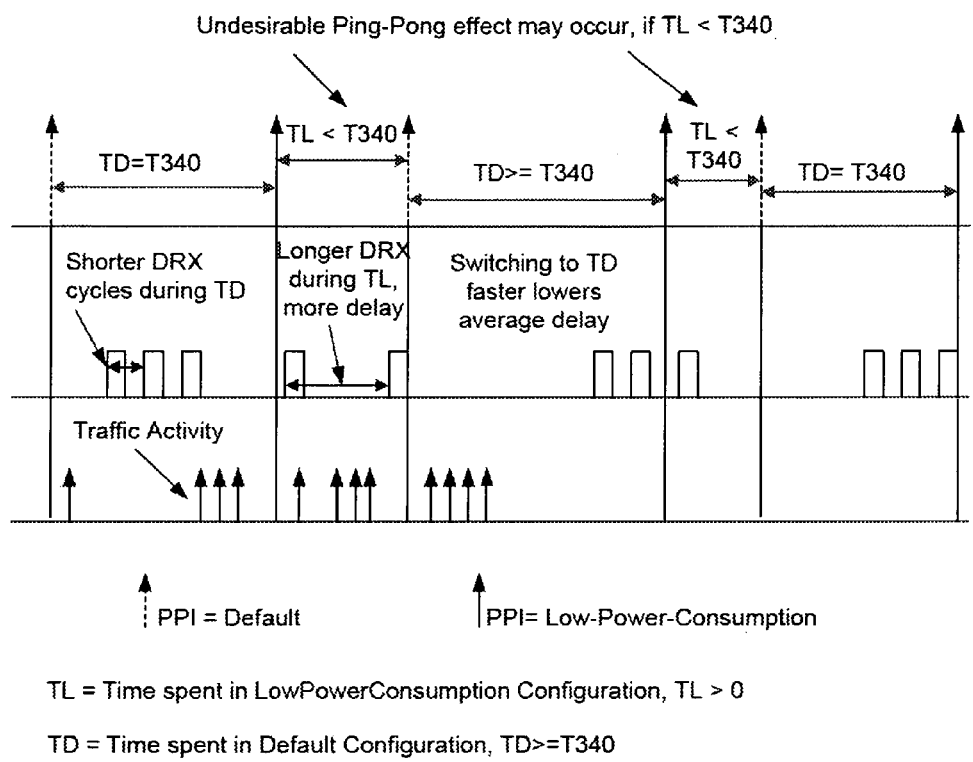
FIG. 2A illustrates a scheme for communicating preferred power consumption configurations with a timer that does not start when a user equipment (UE) switches to a low power consumption configuration in accordance with an example.
Figure 2B:
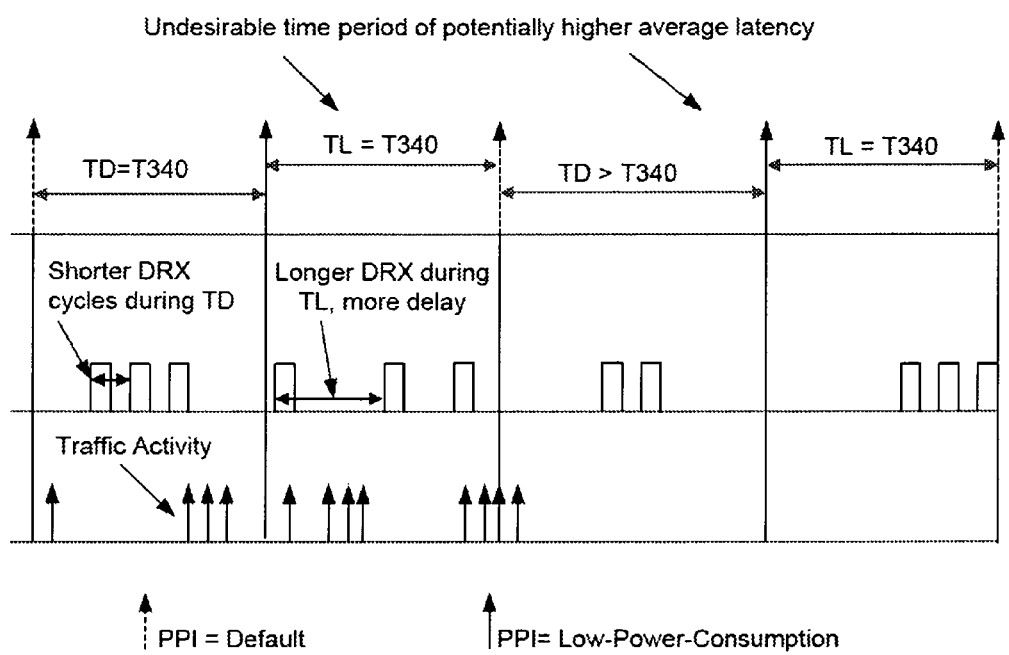
FIG. 2B illustrates a scheme for communicating preferred power consumption configurations with a timer that starts when a user equipment (UE) switches to a low power consumption configuration in accordance with an example.

FIGS. 2A and 2B illustrate examples of a user equipment (UE) not starting a timer (e.g., a T340 prohibit timer) when switching to a low power consumption configuration, and the UE starting the timer (e.g., the T340 prohibit timer) when switching to the low power consumption configuration, respectively. The time period of the T340 prohibit timer may be 1 millisecond (ms), 2 ms, 5 ms, 10 ms, 20 ms, 30 ms, etc. As illustrated in FIGS. 2a and 2B, a dashed arrow may indicate that the UE is initiating the default power consumption configuration and the solid arrow may indicate that the UE is initiating the low power consumption configuration. TL may represent the amount of time the UE spends in the low power consumption configuration, wherein TL>0. TD may represent the amount of time the UE spends in the default power consumption configuration, wherein TD≥T340.

As shown in FIG. 2A, the UE may initiate a default power consumption configuration (i.e., PPI) by communicating the PPI message to the eNB. The eNB may be in the default power consumption configuration for a period of T340. In other words, since the T340 timer starts when the UE switches to the default power consumption configuration, the UE may be in the default power consumption configuration for at least the length of the timer (e.g., T340). In one example, the UE may have shorter discontinuous reception (DRX) cycles during the time spent in the default power consumption configuration.

The UE may subsequently initiate the low power consumption configuration. In addition, the UE may not start the T340 timer after switching to the low power consumption configuration. Thus, the amount of time the UE spends in the low power consumption configuration may be less than or greater to the T340 timer, but greater than 0. In one example, the UE may have longer DRX cycles and greater delay during the time spent in the low power consumption configuration. The UE may be in the low power consumption configuration for less than T340, and then subsequently initiate the default power consumption configuration again. By the UE switching to the default power consumption configuration faster (i.e., in a time period less than T340), the average delay may be lowered. The UE may subsequently switch from the default power consumption configuration to the low power consumption configuration again. The UE may be in the low power consumption configuration for less than T340 before switching back to the default power consumption configuration. The UE may be in the default power consumption configuration for the period of T340.

In the example shown in FIG. 2A, excessive signaling may occur due to the UE initiating the default power consumption configuration shortly after (i.e., a time period less than the T340 timer) switching to the low power consumption configuration. The UE initiating the default power consumption configuration shortly after switching to the low power consumption may be known as a ping-pong effect. However, by the T340 timer not starting after the UE switches to the low power consumption configuration, the UE may avoid unnecessary latency if active traffic arrives at the UE.

As shown in FIG. 2B, the UE may initiate a default power consumption configuration (i.e., PPI) by communicating the PPI message to the eNB. The eNB may be in the default power consumption configuration for a period of T340. In other words, since the T340 timer starts when the UE switches to the default power consumption configuration, the UE may be in the default power consumption configuration for at least the length of the timer (e.g., T340). In one example, the UE may have shorter discontinuous reception (DRX) cycles during the time spent in the default power consumption configuration.

The UE may subsequently initiate the low power consumption configuration. In addition, the T340 timer may start after the UE switches to the low power consumption configuration. Thus, the amount of time the UE spends in the low power consumption configuration may be greater than or equal to the T340 timer. In one example, the UE may have longer DRX cycles and greater delay during the time spent in the low power consumption configuration. The UE may be in the low power consumption configuration for a period of T340, and then subsequently initiate the default power consumption configuration again. The UE may be in the default power consumption configuration for a time period greater than the T340 timer. The UE may subsequently switch to the low power consumption configuration again, and then remain in the low power consumption configuration for the period of the T340 timer.

In the example shown in FIG. 2B, the UE may avoid the ping-pong effect (i.e., the UE going back to the default power consumption configuration from the low power consumption configuration in a time period less than the T340 timer), but at the cost of undesirable time periods of potentially higher average latency. Thus, when the T340 timer starts after the UE switches to the low power consumption configuration, the end-to-end latency may be increased in the case when active traffic arrives at the UE soon after the UE transitions into the low power consumption state, thereby adversely affecting the user experience. In one example, the active traffic may arrive at the UE in the time period less than the T340 timer after the UE transitions into the low power consumption state.

Figure 3:
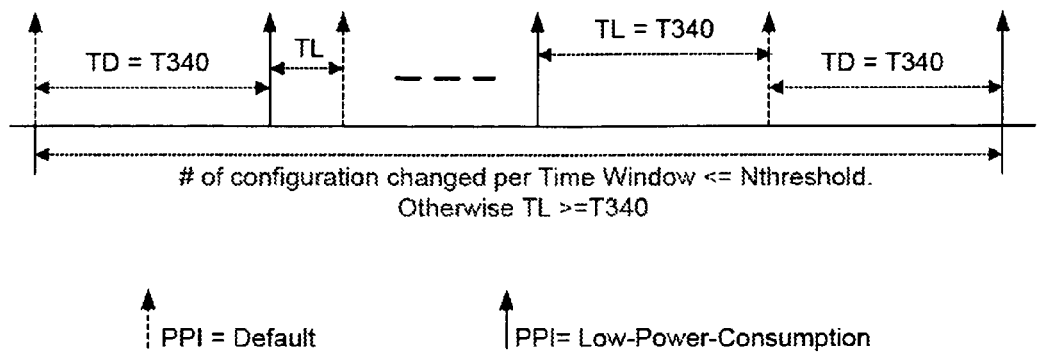
FIG. 3 illustrates a scheme for communicating preferred power consumption configurations using a threshold timer in accordance with an example.

FIG. 3 illustrates an exemplary scheme for communicating preferred power consumption configurations using a threshold timer. FIG. 3 illustrates using the threshold timer to reduce the undesirable higher latency period that results if active traffic arrives at the UE may be avoided, while at the same time, controlling excessive signaling overhead due to the ping-pong effect shown in FIG. 2A. In one example, the threshold timer (e.g., the T340 prohibit timer) may not automatically start after the UE communicates the low power consumption configuration as in LTE Release 11. Rather, the threshold timer may only be implemented when certain conditions satisfying the threshold are met after the UE communicates the low power consumption configuration.

The UE may receive, from the eNB, PPI configuration information including a predetermined threshold ($N_{threshold}$) indicating a maximum number of PPI messages that the UE can communicate to the eNB during a defined time window. In particular, the eNB may limit the number of PPI messages communicated by the UE after the UE communicates a low power consumption configuration. In one example, the PPI configuration information may be dynamically reconfigured by the eNB depending on network conditions. The PPI configuration information may include the predetermined threshold and a time window size associated with the defined time window. The size of the defined time window may be selected as the predetermined threshold times the length of the timer (i.e., $N_{threshold} \times T340$). In addition, the value of the predetermined threshold may be defined as an integer value, such that $N_{threshold} \leq$ Time Window Size/T340. In other words, the length of the defined time window may be some multiple of the timer length. For example, time window size=3 may indicate that the length of the time window is three times the length of the T340 timer. As another example, the length of the time window may be five times the T340 timer length or a half of the T340 timer length The UE may communicate a low power consumption configuration to the UE, and then subsequently communicate a series of additional PPI messages to the eNB indicating either a default power consumption configuration or a low power consumption configuration. The UE may monitor the number of additional PPI messages communicated to the eNB based on PPI configuration information received from the eNB. If the UE detects that the number of additional PPI messages exceed the predetermined threshold during the defined time window (e.g., ten PPI message exchanges during the defined time window), then the UE may initiate the threshold timer. The initiation of the threshold timer (e.g., the T340 timer) may limit the UE from communicating additional PPI messages for the length of the threshold timer. In particular, the threshold timer may be initiated after the last low power consumption configuration message communicated to the eNB. The length of the threshold timer may be 1 ms, 2 ms, 5 ms, 10 ms, 20 ms, 30 ms, etc. Thus, the threshold timer is initiated depending on whether the number of additional PPI messages exceeds the predetermined threshold. When the threshold timer is initiated, the UE cannot communicate preferred power consumption configurations to the eNB for the length of the threshold timer.

When the threshold timer expires (e.g., after 10 ms), the UE may not reinitiate the timer unless certain criteria is met. In other words, the threshold timer may be inactivated and the UE may be free to communicate PPI messages (including low power consumption configuration messages) to the eNB. The UE may not initiate the threshold timer after communicating the low power consumption configuration. However, if the number of PPI messages communicated to the eNB exceeds the predetermined threshold as defined in the PPI configuration information received from the eNB, the UE may reinitiate the threshold timer and prevent the UE from communicating PPI messages until expiry of the threshold timer.

As shown in FIG. 3, the UE may communicate a plurality of preferred power consumption configurations to the eNB. The dashed arrow may indicate that the UE is initiating the default power consumption configuration and the solid arrow may indicate that the UE is initiating the low power consumption configuration. TL may represent the amount of time the UE spends in the low power consumption configuration, wherein TL>0. TD may represent the amount of time the UE spends in the default power consumption configuration, wherein TD≥T340.

As illustrated in FIG. 3, the UE may initiate the default power consumption configuration. Since the T340 timer is activated upon the UE communicating the default power consumption configuration to the eNB, the UE may spend a time period of T340 in the default power consumption configuration. The UE may subsequently initiate the low power consumption configuration. After the UE communicates the low power consumption configuration, the threshold timer is not initiated as long as the UE does not subsequently change its preferred power consumption configuration over the predetermined threshold per time window, If the number of times that the UE changes its power configuration is greater than the predetermined threshold, the threshold timer is activated and the UE cannot send PPI messages to the eNB for the length of the threshold timer (e.g., the T340 timer).

As shown in FIG. 3, the UE may communicate a plurality of additional preferred power consumption configuration messages after the initial low power consumption configuration message. The plurality of additional preferred power consumption configuration messages may exceed the predetermined threshold. Thus, when the UE switches to the low power consumption configuration after exceeding the predetermined threshold (illustrated by the second low power consumption configuration in FIG. 3), the threshold timer (e.g., the T340 timer) may be activated. Thus, the UE has to wait until the T340 timer expires before communicating another default power consumption configuration. In addition, the UE may remain in the default power consumption configuration for the time period of T340. By using the threshold timer to restrict the number of preferred power consumption configurations that are communicated to the eNB after the UE switches to the low power consumption configuration, excessive user assistance signaling may be reduced at the UE.

Figure 4:
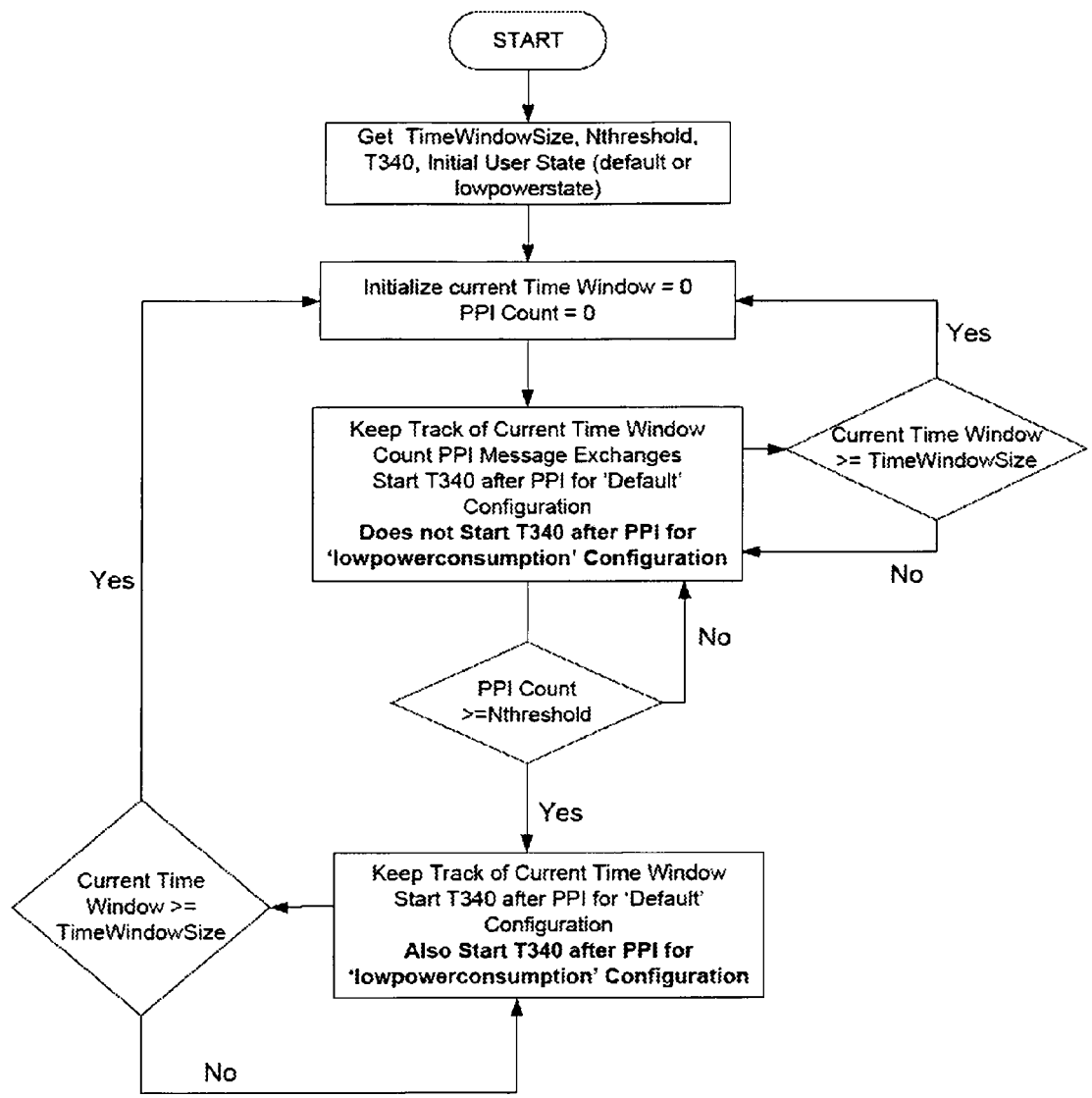
FIG. 4 is a flowchart illustrating a scheme for communicating preferred power consumption configurations using a threshold timer in accordance with an example.

FIG. 4 is a flowchart illustrating a scheme for communicating preferred power consumption configurations using a threshold timer. A user equipment (UE) may receive a time window size and a predetermined threshold ($N_{threshold}$). As previously discussed, the time window size may be the predetermined threshold ($N_{threshold}$) times the length of the timer (i.e., $N_{threshold} \times T340$), wherein $N_{threshold}$ is an integer number. In one example, the UE may receive the time window size and the predetermined threshold in a radio resource control (RRC) configuration establishment message from an evolved node B (eNB). The UE may initiate a threshold timer (e.g., a T340 prohibit timer) using the time window size and the predetermined threshold. In addition, the UE may identify an initial user state (e.g., a default power consumption configuration or a low power consumption configuration of the UE).

The UE may initialize a defined time window, such as the current time window, such that the current time window=0. The UE may set a power preference indication (PPI) count to 0. The UE may keep track of the current time window. If the current time window is greater than the time window size, then the UE may reinitialize the current time window to 0 and the PPI count to 0. In addition, the UE may count the number of PPI messages exchanged between the UE and the eNB. As previously discussed, the UE may communicate the PPI messages to change from a low power state to a default state, or vice versa.

The UE may start the T340 timer after communicating a PPI message to the eNB indicating a default power consumption configuration. Alternatively, the UE may not start the T340 timer after communicating a PPI message to the eNB indicating a low power consumption configuration. The UE may monitor whether the PPI count (i.e., the number of PPI messages exchanged between the UE and the cNB) is greater than or equal to $N_{threshold}$. If the number of PPI messages is not greater than or equal to $N_{threshold}$, then the UE may continue counting the number of PPI messages exchanged between the UE and the eNB. Alternatively, if the number of PPI messages is greater than or equal to $N_{threshold}$, then the UE may keep track of the current time window. In addition, the UE may start the T340 timer after communicating an additional PPI message to the eNB indicating a default power consumption configuration. Alternatively, the UE may start the T340 timer after communicating an additional PPI message to the eNB indicating a low power consumption configuration. If the current time window is greater than the time window size, then the UE may reinitialize the current time window to 0 and the PPI count to 0, and continue counting the number of PPI messages exchanged between the UE and the eNB. The subsequent steps performed by the UE are as previously described.

FIG. 5 illustrates an abstract syntax notation (ASN) code example for communicating preferred power consumption configurations using a threshold timer. The eNB may communicate a radio resource control (RRC) configuration establishment message to the UE. The RRC configuration establishment message may include an Other Configuration (otherConfig) information element (IE). FIG. 5 illustrates example ASN.1 code associated with the otherConfig IE. In particular, the ASN.1 code may configure a power preference indication time window (powerPrefIndication-TimeWindow) with a minimum and maximum integer value (e.g., n2 and N340, respectively). In addition, the ASN.1 code may configure a power preference indication predetermined threshold (powerPrefIndication-Nthreshold) with a minimum and maximum integer value (e.g., n2 and N341, respectively).

FIGS. 6A and 6B are tables with field descriptions of various parameters and constants, respectively, used for communicating preferred power consumption configurations using a threshold timer. In particular, the parameters and constants may be included in the ASN.1 code example associated with the otherConfig IE that is illustrated in FIG. 5. The parameters may include powerPrefIndication-TimeWindow and powerPrefIndication-Nthreshold. The parameter powerPrefIndication-TimeWindow may indicate the time window size value in terms of the timer T340. For example, if powerPrefIndication-TimeWindow=2, then the time window size will be two times the time period of T340. The parameter powerPrefIndication-Nthreshold is an upper limit for the number of PPI messages that can be exchanged during each time window. If the powerPrefIndication-Nthreshold is exceeded, the T340 timer may start upon the UE sending each PPI for a low power consumption configuration. The constant N340 is the maximum value of powerPrefIndication-TimeWindow. The constant N341 is the maximum value of powerPrefIndication-Nthreshold.

Figure 7:
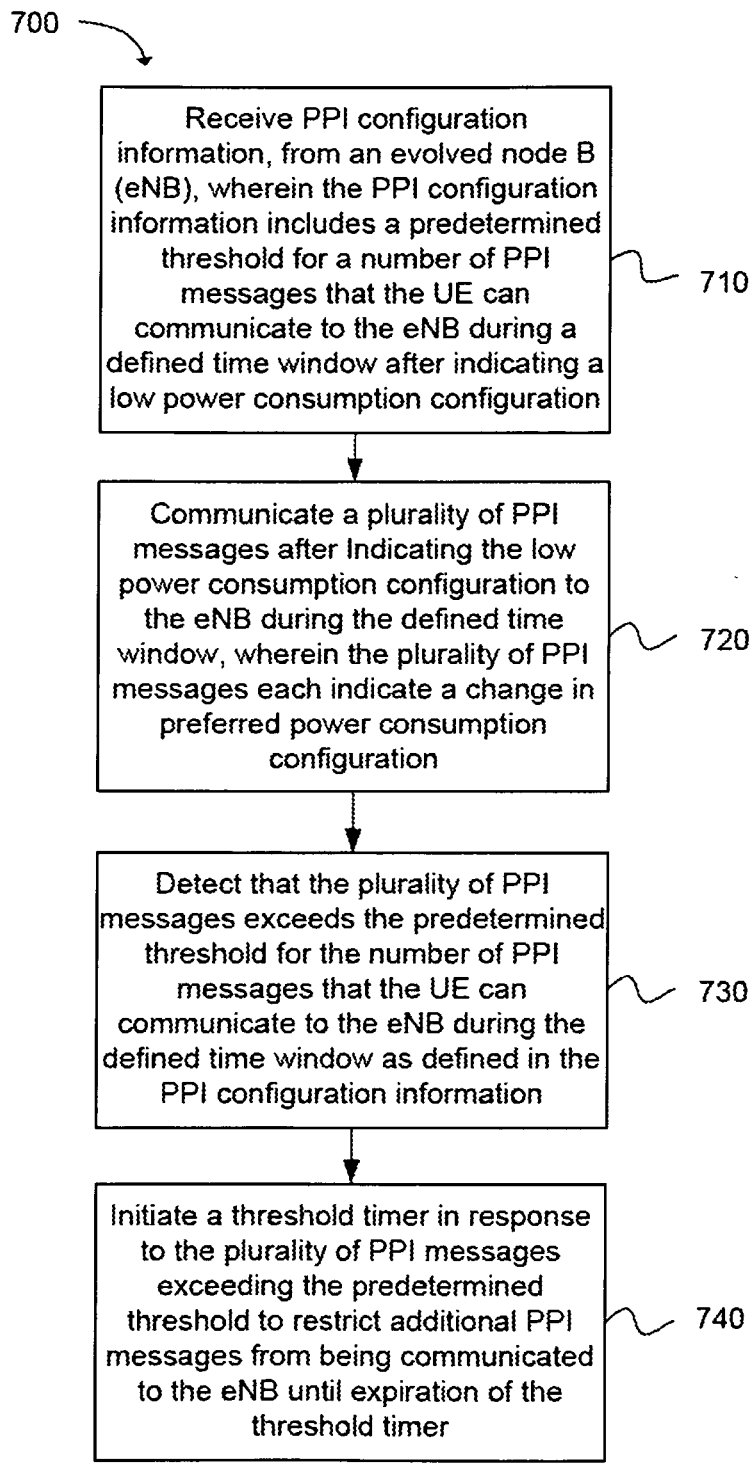
FIG. 7 depicts functionality of computer circuitry of a user equipment (UE) operable to communicate a power preference indication (PPI) message in accordance with an example.

Another example provides functionality 700 of computer circuitry of a user equipment (UE) operable to communicate a power preference indication (PPI) message, as shown in the flow chart in FIG. 7. The functionality may be implemented as a method or the functionality may be executed as instructions on a machine, where the instructions are included on at least one computer readable medium or one non-transitory machine readable storage medium. The computer circuitry can be configured to receive PPI configuration information, from an evolved node B (eNB), wherein the PPI configuration information includes a predetermined threshold for a number of PPI messages that the UE can communicate to the eNB during a defined time window after indicating a low power consumption configuration, as in block 710. The computer circuitry can be configured to communicate a plurality of PPI messages after indicating the low power consumption configuration to the eNB during the defined time window, wherein the plurality of PPI messages each indicate a change in preferred power consumption configuration, as in block 720. The computer circuitry may be further configured to detect that the plurality of PPI messages exceeds the predetermined threshold for the number of PPI messages that the UE can communicate to the eNB during the defined time window as defined in the PPI configuration information, as in block 730. The computer circuitry may be further configured to initiate a threshold timer in response to the plurality of PPI messages exceeding the predetermined threshold to restrict additional PPI messages from being communicated to the eNB until expiration of the threshold timer, as in block 740.

In one example, the PPI configuration information includes the predetermined threshold and a time window size associated with the defined time window, wherein the time window size is the predetermined threshold times a length of the threshold timer. In addition, the computer circuitry may be further configured to receive the PPI configuration information, at the UE, in a PPI configuration information element (IE) included in a radio resource control (RRC) configuration establishment message from the eNB.

In one configuration, the computer circuitry may be further configured to determine that additional messages should not be restricted from being communicated to the eNB when the plurality of PPI messages does not exceed the predetermined threshold during the defined time window. In addition, the threshold timer is a T340 prohibit timer.

In one configuration, the computer circuitry may be further configured to communicate the PPI message indicating the default power consumption configuration, to the eNB, in response to the UE detecting an initialization of a delay sensitive application. In addition, the computer circuitry may be further configured to reinitiate the threshold timer after the threshold timer expires when the plurality of PPI messages communicated after expiration of the threshold timer exceeds the predetermined threshold. In one example, the computer circuitry may be further configured to initiate the threshold timer in response to sending a PPI message, to the eNB, indicating a default power consumption configuration. Furthermore, the UE may include an antenna, a touch sensitive display screen, a speaker, a microphone, a graphics processor, an application processor, internal memory, or a non-volatile memory port.

Figure 8:
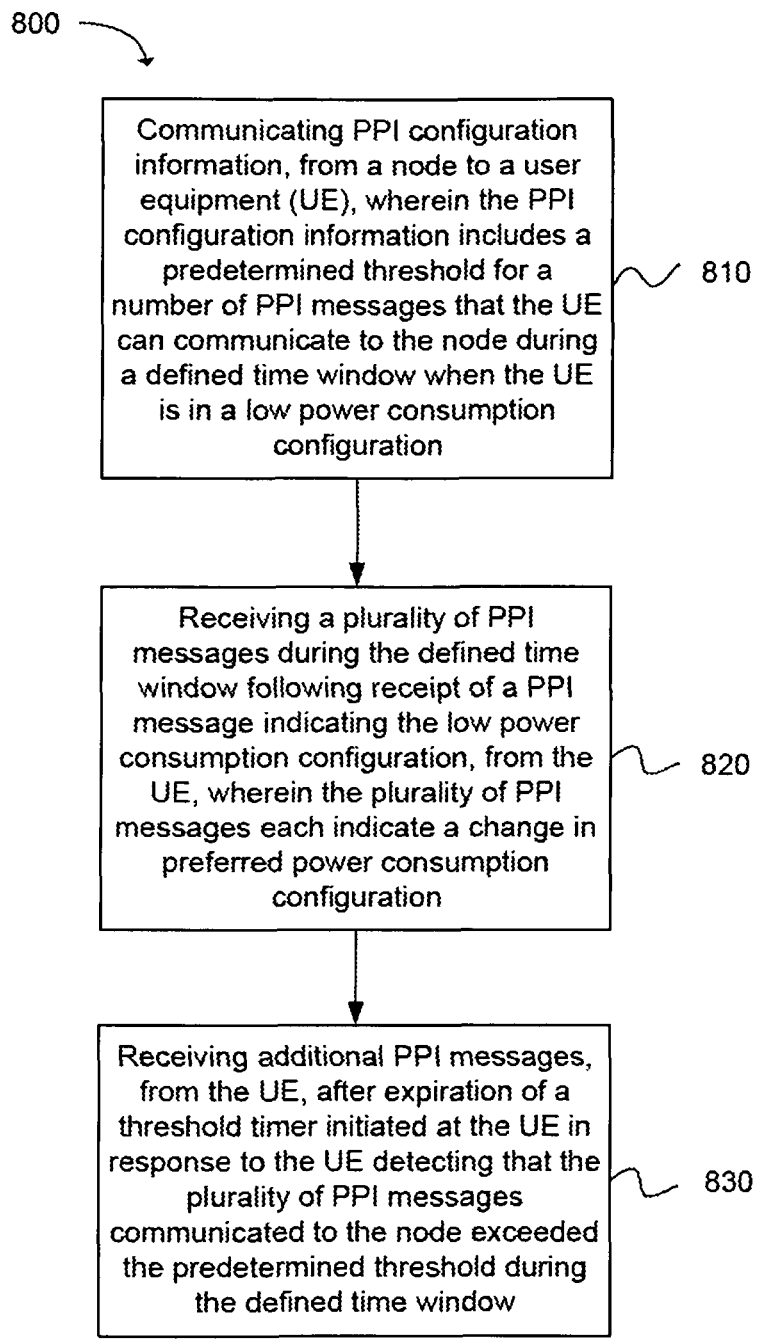
FIG. 8 depicts a flow chart of a method for communicating power preference indication (PPI) messages in accordance with an example.

Another example provides a method 800 for communicating power preference indication (PPI) messages, as shown in the flow chart in FIG. 8. The method may be executed as instructions on a machine, where the instructions are included on at least one computer readable medium or one non-transitory machine readable storage medium. The method includes the operation of communicating PPI configuration information, from a node to a user equipment (UE), wherein the PPI configuration information includes a predetermined threshold for a number of PPI messages that the UE can communicate to the node during a defined time window when the UE is in a low power consumption configuration, as in block 810. The method may include receiving a plurality of PPI messages during the defined time window following receipt of a PPI message indicating the low power consumption configuration, from the UE, wherein the plurality of PPI messages each indicate a change in preferred power consumption configuration, as in block 820. The method may further include receiving additional PPI messages, from the UE, after expiration of a threshold timer initiated at the UE in response to the UE detecting that the plurality of PPI messages communicated to the node exceeded the predetermined threshold during the defined time window, as in block 830.

In one example, the method may include communicating the PPI configuration information to the UE including the predetermined threshold and a time window size associated with the defined time window, wherein the time window size is the predetermined threshold times a length of the threshold timer. In addition, the method may include communicating the PPI configuration information, to the UE, in a PPI configuration information element (IE) included in a radio resource control (RRC) configuration establishment message from the node.

In one configuration, the method may include receiving the additional PPI messages from the UE after expiration of a T340 prohibit timer. In addition, the method may include receiving the PPI message indicating the default power consumption configuration, at the node, in response to the UE detecting an initialization of a delay sensitive application. Furthermore, the method may include receiving the plurality of PPI messages, from the UE, indicating the change in preferred power consumption configuration, wherein the change in preferred power consumption configuration indicates one of: a default power consumption configuration or the low power consumption configuration. In one example, the node is selected from a group consisting of a base station (BS), a Node B (NB), an evolved Node B (eNB), a baseband unit (BBU), a remote radio head (RRH), a remote radio equipment (RRE), or a remote radio unit (RRU).

Figure 9:
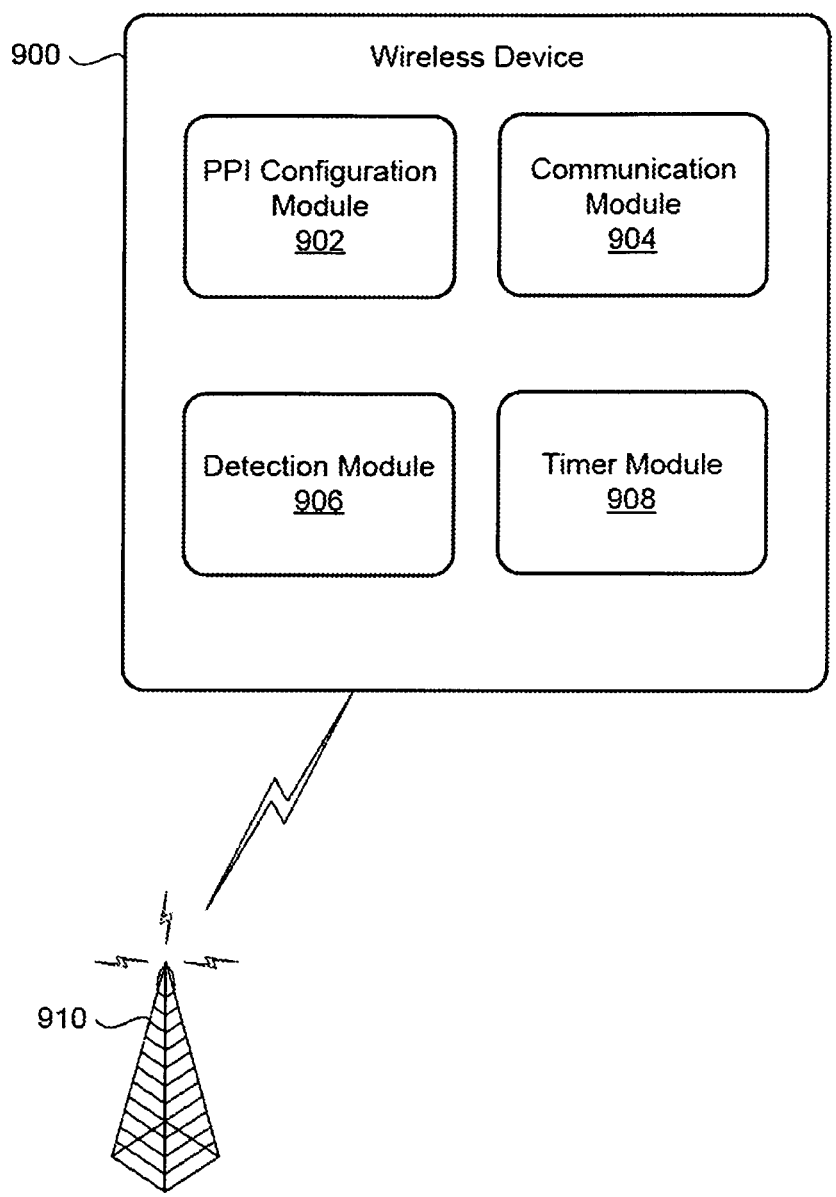
FIG. 9 illustrates a block diagram of a user equipment (UE) operable to communicate a power preference indication (PPI) message in accordance with an example.

FIG. 9 illustrates an example wireless device (e.g., a user equipment) 900 that is configured to communicate a power preference indication (PPI) message, as shown in another embodiment of the present invention. The wireless device comprises a PPI configuration module 902 configured to receive PPI configuration information, from an evolved node B (eNB), wherein the PPI configuration information includes a predetermined threshold for a number of PPI messages that the UE can communicate to the eNB during a defined time window after indicating a low power consumption configuration. The wireless device may comprise a communication module 904 configured to communicate a plurality of PPI messages after sending the low power consumption configuration to the eNB during the defined time window, wherein the plurality of PPI messages each indicate a change in preferred power consumption configuration. The wireless device may further comprise a detection module 906 configured to detect that the plurality of PPI messages exceeds the predetermined threshold for the number of PPI messages that the UE can communicate to the eNB during the defined time window as defined in the PPI configuration information. In addition, the wireless device may comprise a timer module 908 configured to initiate a threshold timer in response to the plurality of PPI messages exceeding the predetermined threshold to restrict additional PPI messages from being communicated to the eNB until expiration of the threshold timer.

In one example, the PPI configuration module is further configured to receive the PPI configuration information, at the UE, in a PPI configuration information element (IE) included in a radio resource control (RRC) configuration establishment message from the eNB. In addition, the communication module is further configured to communicate the PPI message indicating the default power consumption configuration, to the eNB; in response to the UE detecting an initialization of a delay sensitive application.

In one configuration, the timer module is further configured to determine that additional messages should not be restricted from being communicated to the eNB when the plurality of PPI messages does not exceed the predetermined threshold during the defined time window. In one example, the timer module is further configured to initiate a T340 prohibit timer in response to the plurality of PPI messages exceeding the predetermined threshold. In addition, the timer module is further configured to reinitiate the threshold timer after expiration of the threshold timer when the plurality of PPI messages communicated after expiration of the threshold timer exceeds the predetermined threshold. Furthermore, the timer module is further configured to initiate the threshold timer in response to the UE indicating a default power consumption configuration.

Figure 10:
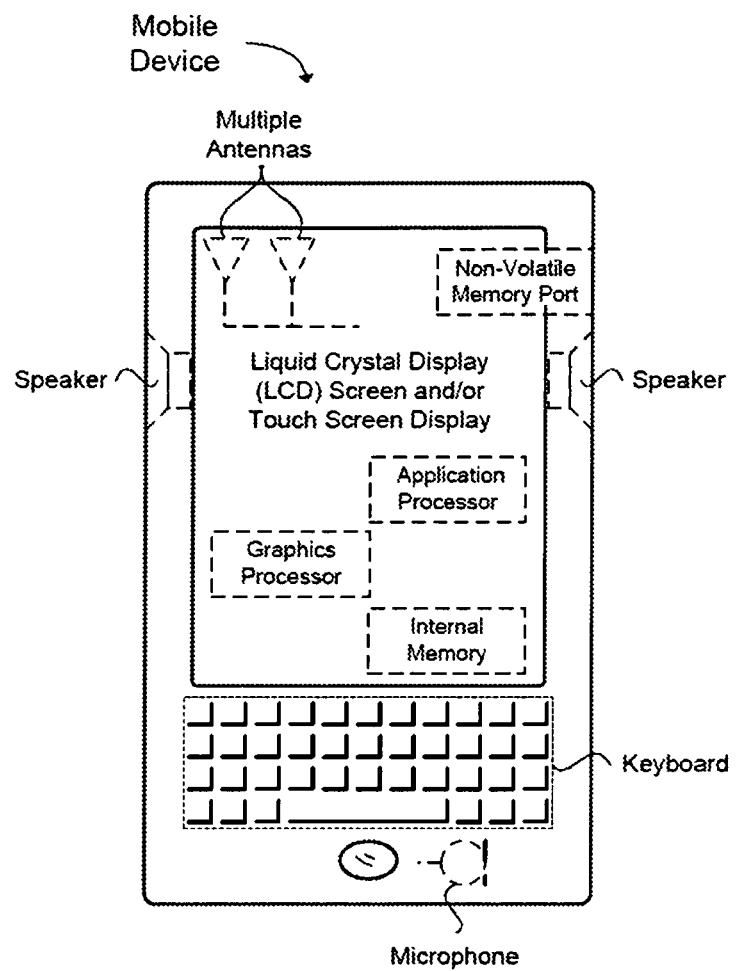
FIG. 10 illustrates a block diagram of a mobile device (e.g., a user equipment) in accordance with an example.

FIG. 10 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with a node, macro node, low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 10 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus of a user equipment (UE) operable to communicate a power preference indication (PPI) message, the apparatus comprising computer circuitry configured to:
    receive PPI configuration information, from an evolved node B (eNB), wherein the PPI configuration information includes a predetermined threshold for a number of PPI messages that the UE can communicate to the eNB during a defined time window after indicating a low power consumption configuration;
    communicate a plurality of PPI messages after indicating the low power consumption configuration to the eNB during the defined time window, wherein the plurality of PPI messages each indicate a change in preferred power consumption configuration;
    detect that the plurality of PPI messages exceeds the predetermined threshold for the number of PPI messages that the UE can communicate to the eNB during the defined time window as defined in the PPI configuration information; and
    initiate a threshold timer in response to the plurality of PPI messages exceeding the predetermined threshold to restrict additional PPI messages from being communicated to the eNB until expiration of the threshold timer.

2. The apparatus of claim 1, wherein the PPI configuration information includes the predetermined threshold and a time window size associated with the defined time window, wherein the time window size is the predetermined threshold times a length of the threshold timer.

3. The apparatus of claim 1, further configured to receive the PPI configuration information, at the UE, in a PPI configuration information element (IE) included in a radio resource control (RRC) configuration establishment message from the eNB.

4. The apparatus of claim 1, further configured to determine that additional messages should not be restricted from being communicated to the eNB when the plurality of PPI messages do not exceed the predetermined threshold during the defined time window.

5. The apparatus of claim 1, wherein the threshold timer is a T340 prohibit timer.

6. The apparatus of claim 1, further configured to communicate the PPI message indicating the default power consumption configuration, to the eNB, in response to the UE detecting an initialization of a delay sensitive application.

7. The apparatus of claim 1, further configured to reinitiate the threshold timer after the threshold timer expires when the plurality of PPI messages communicated after expiration of the threshold timer exceeds the predetermined threshold.

8. The apparatus of claim 1, further configured to initiate the threshold timer in response to sending a PPI message, to the eNB, indicating a default power consumption configuration.

9. The apparatus of claim 1, wherein the UE includes an antenna, a touch sensitive display screen, a speaker, a microphone, a graphics processor, an application processor, internal memory, or a non-volatile memory port.

10. A method for communicating power preference indication (PPI) messages, the method comprising:
communicating PPI configuration information, from a node to a user equipment (UE), wherein the PPI configuration information includes a predetermined threshold for a number of PPI messages that the UE can communicate to the node during a defined time window when the UE is in a low power consumption configuration;
receiving a plurality of PPI messages during the defined time window following receipt of a PPI message indicating the low power consumption configuration, from the UE, wherein the plurality of PPI messages each indicate a change in preferred power consumption configuration; and
receiving additional PPI messages, from the UE, after expiration of a threshold timer initiated at the UE in response to the UE detecting that the plurality of PPI messages communicated to the node exceeded the predetermined threshold during the defined time window.

11. The method of claim 10, further comprising communicating the PPI configuration information to the UE including the predetermined threshold and a time window size associated with the defined time window, wherein the time window size is the predetermined threshold times a length of the threshold timer.

12. The method of claim 10, further comprising communicating the PPI configuration information, to the UE, in a PPI configuration information element (IE) included in a radio resource control (RRC) configuration establishment message from the node.

13. The method of claim 10, further comprising receiving the additional PPI messages from the UE after expiration of a T340 prohibit timer.

14. The method of claim 10, further comprising receiving the PPI message indicating the default power consumption configuration, at the node, in response to the UE detecting an initialization of a delay sensitive application.

15. The method of claim 10, further comprising receiving the plurality of PPI messages, from the UE, indicating the change in preferred power consumption configuration, wherein the change in preferred power consumption configuration indicates one of: a default power consumption configuration or the low power consumption configuration.

16. The computer circuitry of claim 10, wherein the node is selected from a group consisting of a base station (BS), a Node B (NB), an evolved Node B (eNB), a baseband unit (BBU), a remote radio head (RRH), a remote radio equipment (RRE), or a remote radio unit (RRU).

17. An apparatus of a user equipment (UE) operable to communicate a power preference indication (PPI) message, the apparatus having computer circuitry comprising:
a PPI configuration module configured to receive PPI configuration information, from an evolved node B (eNB), wherein the PPI configuration information includes a predetermined threshold for a number of PPI messages that the UE can communicate to the eNB during a defined time window after indicating a low power consumption configuration;
a communication module configured to communicate a plurality of PPI messages after sending the low power consumption configuration to the eNB during the defined time window, wherein the plurality of PPI messages each indicate a change in preferred power consumption configuration;
a detection module configured to detect that the plurality of PPI messages exceeds the predetermined threshold for the number of PPI messages that the UE can communicate to the eNB during the defined time window as defined in the PPI configuration information; and
a timer module configured to initiate a threshold timer in response to the plurality of PPI messages exceeding the predetermined threshold to restrict additional PPI messages from being communicated to the eNB until expiration of the threshold timer.

18. The apparatus of claim 17, wherein the PPI configuration module is further configured to receive the PPI configuration information, at the UE, in a PPI configuration information element (IE) included in a radio resource control (RRC) configuration establishment message from the eNB.

19. The apparatus of claim 17, wherein the timer module is further configured to determine that additional messages should not be restricted from being communicated to the eNB when the plurality of PPI messages do not exceed the predetermined threshold during the defined time window.

20. The apparatus of claim 17, wherein the timer module is further configured to initiate a T340 prohibit timer in response to the plurality of PPI messages exceeding the predetermined threshold.

21. The apparatus of claim 17, wherein the communication module is further configured to communicate the PPI message indicating the default power consumption configuration, to the eNB, in response to the UE detecting an initialization of a delay sensitive application.

22. The apparatus of claim 17, wherein the timer module is further configured to reinitiate the threshold timer after expiration of the threshold timer when the plurality of PPI messages communicated after expiration of the threshold timer exceeds the predetermined threshold.

23. The apparatus of claim 17, wherein the timer module is further configured to initiate the threshold timer in response to the UE indicating a default power consumption configuration.

* * * * *